United States Patent [19]
Yamada

[11] Patent Number: 4,583,125
[45] Date of Patent: Apr. 15, 1986

[54] METHOD FOR MANUFACTURING ECLECTIC MASKS

[75] Inventor: Mitsuhiko Yamada, Kyoto, Japan

[73] Assignee: Dainippon Screen Mfg. Co., Ltd., Kyoto, Japan

[21] Appl. No.: 405,735

[22] Filed: Aug. 6, 1982

[30] Foreign Application Priority Data

Aug. 28, 1981 [JP] Japan ................... 56-135942

[51] Int. Cl.⁴ ............................................. H04N 7/00
[52] U.S. Cl. ........................................ 358/284; 358/96; 382/8
[58] Field of Search .................. 358/284, 96, 280, 169; 382/8

[56] References Cited

U.S. PATENT DOCUMENTS

| | | | |
|---|---|---|---|
| 4,075,658 | 2/1978 | de Cosnac et al. | 358/96 |
| 4,220,972 | 9/1980 | Geokezas et al. | 358/169 |
| 4,450,483 | 5/1984 | Coviello | 358/96 |

FOREIGN PATENT DOCUMENTS

| | | |
|---|---|---|
| 2154902 | 11/1971 | Fed. Rep. of Germany . |
| 2414806 | 6/1975 | Fed. Rep. of Germany . |
| 2729113 | 1/1979 | Fed. Rep. of Germany . |
| 54-29202 | 3/1979 | Japan . |
| 54-36801 | 3/1979 | Japan . |
| WO80/02612 | 5/1980 | PCT Int'l Appl. . |

*Primary Examiner*—Edward L. Coles, Sr.
*Attorney, Agent, or Firm*—Brumbaugh, Graves, Donohue & Raymond

[57] ABSTRACT

The invention provides a method for manufacturing eclectic masks, the method comprising a computation of contour signals and a step of entering them in portions of a proper memory medium wherein said computation is conducted, by CPU, simultaneously with the usual treatment of image signals in the photographical plate making process. Said portions for contour signals are allotted in said medium so as to have the same addresses as those for the usual image signals stored in other medium, or more conveniently each of the contour signals is incorporated into each of the image signals, so that in a layout operation on a monitor screen the eclectic mask composed of corrected contour signals can be easily and accurately superposed on or collated with the pictorial image of the picture to be formed on the printing plate.

4 Claims, 7 Drawing Figures

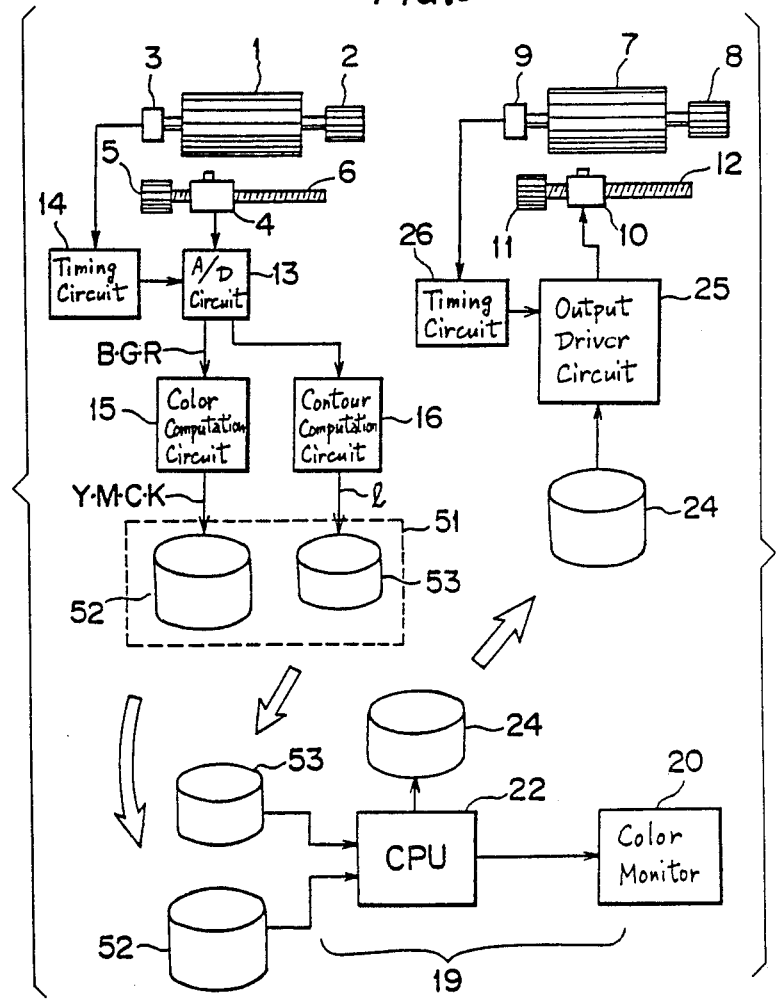
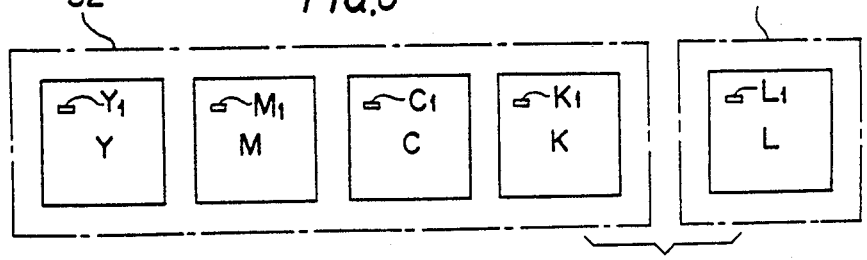

METHOD FOR MANUFACTURING ECLECTIC MASKS

BACKGROUND OF THE INVENTION

The present invention relates to a method for manufacturing eclectic masks used in the photomechanical process, and more particularly to a method for eclectic mask preparation carried out by means of an image scanning recorder such as a color scanner.

In general, an eclectic mask (sometimes called also "cut mask" or "cutout mask") is used for many purposes such as making up a composite picture or image from, for instance, two photographs by using a part of either photograph, erasing backgrounds of photographs, partially adding or restraining exposure when taking a photograph.

Such eclectic masks have been manufactured heretofore by handicraft. For example, a transparent sheet is set on a photographic film laid on a light table, and a fine line is drawn on the sheet along the contour of a shape expressing a photographic theme such as a portrait or a trade sample. The inside or outside of the contour line drawn on the sheet is then painted out. In another handicraft technique, said fine line is drawn directly on the photographic film per se for directly painting out. It is however difficult and requires great skill to quickly draw the contour line with correctness in these manual works.

The applicant has already proposed some improvements in respect of the eclectic mask preparation wherein an image scanning recorder such as a color scanner is made use of for a convenient speedy manufacture of precise eclectic masks. One of said proposals is disclosed in the Japanese Patent Laying-open Gazette Sho. 54-29202 titled "An apparatus for making contoured images". The other proposal is disclosed in ibid. Sho. 54-36801 titled "A method for eclectic mask preparation".

These apparatus and method utilize, as a principal means, a quadratic differential operator that is well known in the pictorial image treatment technology as a measure for detection of pictorial image contours. Eclectic masks can be thus manufactured at real time without any handicraft. In the abovesaid apparatus, only the required contour of pictorial image is automatically picked up while in the abovesaid method there may be manufactured an eclectic mask with a contour line the inside or outside of which is "painted out" by means of its recording system for reproduction thereby making it unnecessary to paint out said inner or outer area in a subsequent process.

BRIEF SUMMARY OF THE INVENTION

It is an object of this invention to provide a more practical method for manufacturing eclectic masks.

Another object of the invention is to provide an improved method in which contour signals are more effectively processed though they may be produced by means of a quadrant differential operator in a manner similar to that disclosed in the aforesaid Gazettes Sho. 54-29202 and Sho. 54-36801.

Still another object of the invention is to provide a method for manufacturing eclectic masks in which required contour signal are computed simultaneously with an image signal processing. The computation is followed by, in the invention, a step of writing the contour signals corresponding to the image signals into a memory or storage medium in the same address arrangement as that in the input of the image signals. Accordingly, it will become easy to quickly and precisely superpose the pictorial image upon the eclectic mask formed with a contour line on a monitor screen when a layout operation is conducted.

It is a further object of the invention to provide a method for manufacturing eclectic masks in which the computed contour signals are respectively converted into a one-bit signals representing the former by means of a predetermined threshold value so that the one-bit signals may be incorporated directly into such an address as allotted to, for instance, signals for recording a black plate which needs not a so high gradient. This will result in a more practical method effective to give an excellent performance of the same degree as is the aforesaid known apparatus or method, without increasing the memory capacity.

Other objects and merits will become apparent in a detailed description that follows hereinafter with reference to the drawings showing embodiments of this invention.

BRIEF DESCRIPTION OF THE DRAWINGS

FIG. 5 is a block diagram of another exemplified apparatus also making use of a color scanner and also intended to be used for an execution of the invention; and FIG. 6 schematically illustrates the addresses of a main memory medium together with same of another memory medium for contour signals both included in the apparatus shown in FIG. 5 to thereby indicate that they have the same address arrangement.

DETAILED DESCRIPTION OF THE INVENTION

Figure 1:
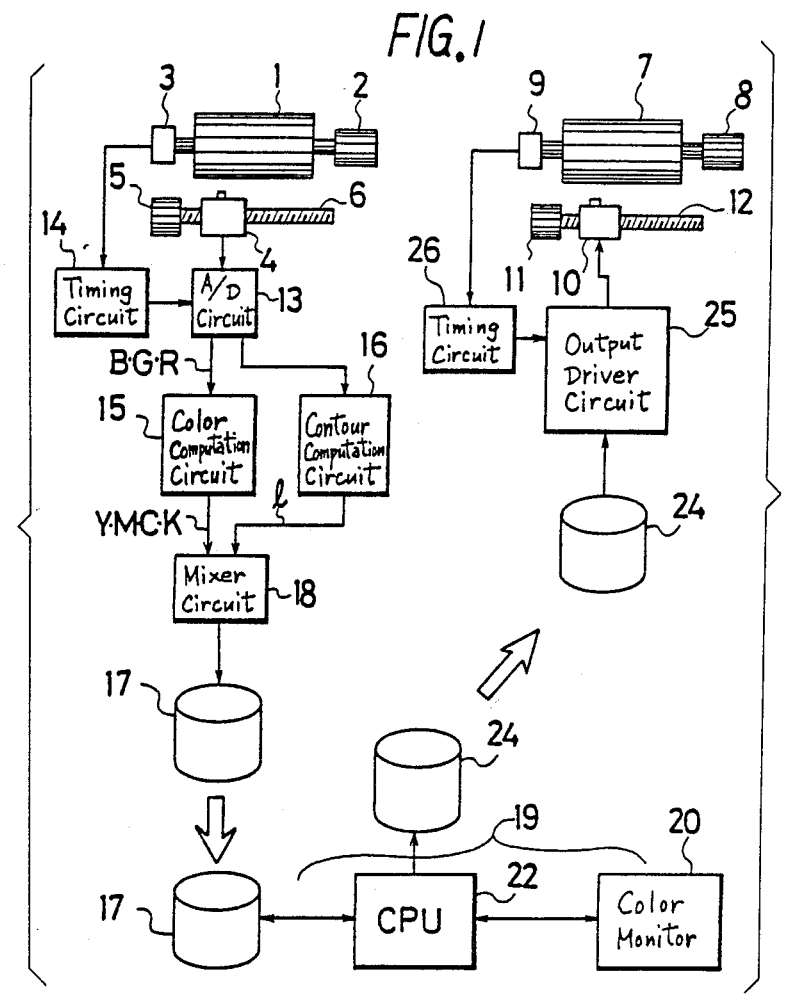
FIG. 1 is a block diagram illustrating an exemplified apparatus that is inherently or particularly used in the invention and comprises a color scanner.

The preferred embodiments of the invention will be described hereinafter by referring to the drawings.

In FIG. 1 which exemplifies an apparatus for the invention, the reference numeral 2 indicate a motor driving an original picture cylinder 1 to rotate in the primary scanning direction, an original picture being attached to the cylinder. A rotary encoder 3 is coaxially mounted to said cylinder 1 to produce, for each rotation thereof, one and plural pulse signals.

Another motor 5 moves a scanning head 4 by rotating a feed screw 6 meshing therewith so that the head can pick up image signals by photoelectrically scanning the original picture in a serial order of scanning lines while moving in the secondary scanning direction. The abovesaid members compose a scanning system having a color scanner.

On the other hand, a recording system for the color scanner is organized in the following manner. Namely, a recording cylinder 7 having attached thereto a photosensitive material such as a film is driven by a motor 8 to rotate in the primary scanning direction. A rotary encoder 9 coaxially mounted to the cylinder 7 produces one and plural pulse signals for each rotation thereof. A further motor 11 rotates a feed screw 12 to thereby move a recording head 10 in the secondary scanning direction so that the photosensitive material can be exposed to a lighting beam with desired intensities in a serial order of scanning lines and in accordance with the image signals produced in and fed from the aforedescribed scanning system.

The reference numeral 13 indicates an analog-to-digital conversion circuit which receives the image signals fed thereto from the scanning head 4 so as to convert it into digital signals (the circuit will be abbreviated as "A/D circuit" hereinafter). A timing circuit 14 includes a subordinate circuit for determinations of timing and addressing as well as another subordinate circuit for control of writing in and reading from a memory 17. The former sub-circuit receives pulse signals from the rotary encoder 3 and produces sampling pulse signals which control the timing of analog-to-digital conversion in the A/D circuit 13. Said sub-circuit produces also addressing signals for a color computation circuit 15 and for a contour computation circuit 16, the addressing signals thereby determining circuit 16, the addressing signals thereby determing the addresses in the memory medium 17. The latter of said two sub-circuits, on the other hand, produces signals which control the steps of writing data in and reading same from said memory medium 17 by utilizing the said sampling pulse signals supplied from the former sub-circuit.

The color computation circuit 15 converts the image signals representing red (R), green (G) and blue (B) into recording signals respectively corresponding to cyan (C), magenta (M), yellow (Y) and black (K). Before such conversion, some treatments are conducted on said image signals for the purpose of color correction, graduation control and contrast control that are similar to those usually effected in color scanner system. Since such color computation circuit is however not a substance of the invention, no more detail will be given hereinafter.

The contour computation circuit 16 is provided with a built-in memory device in which an amount of signals representing the pictorial elements included in at least two scanning lines are stored for any one of color signals (B), (G) and (R). In this circuit 16, contour signals (L) are produced through a given way of electronic calculation in a serial order of scanning lines wherein a proper amount of signals for required pictorial elements are read from the built-in memory. A principle and details in the calculation of contour signals (L) are fully described in the aforementioned Japanese Patent Laying-open Gazettes Sho. 54-36801 and Sho. 54-29202. The invention disclosed in Japanese Laid-Open Publication No. Sho 54-29202 relates to an apparatus for making contoured images which are necessary when manufacturing eclectic masks for use in photomechanical process, by means of an apparatus for image scanning and recording, such as a scanner. According to that invention, there is provided an apparatus for making contoured images wherein images to be recorded are duplicated or reproduced by controlling a recording means through the utilization of an image signal obtained by photoelectrically scanning an original picture in sequential order of scanning times. The apparatus is characterized by comprising a memory for storing each signal volume of pictorial elements of the original picture adjacent to the element just being scanned, a control circuit for controlling timing and address of X, Y axis in which an address signal for writing in and reading out of the memory and a sampling pulse signal for the image signals are prepared, a control circuit for preparing a read/write signal for the memory by receiving the sampling signal, a computing circuit for computing the contour signal value of the pictorial element of the original picture on the scanning line before the scanning line just being scanned based on the sampled image signal value and the signal value read out of the memory, and an output driver circuit for controlling the output signal from the computing circuit.

The invention disclosed in Japanese Laid-Open Publication No. Sho 54-36801 relates to a method for manufacturing eclectic masks for use in photomechanical process by means of an apparatus for image scanning and recording, such as a scanner. According to the invention, there is provided a method for manufacturing eclectic masks characterized by comprising a step of comparing a required threshold with a computed contour signal value based on an image signal value obtained by photoelectrically scanning pictorial elements of an original picture on the scanning lines in sequential order and an image signal value obtained from the pictorial elements adjacent to the element just being scanned, a step of storing addresses corresponding to the contour signal values which exceed the threshold in a memory in sequential order as address signals, a step of reading the address signals out of the memory in sequential order to display such signals on a monitor, a step of writing again in the memory assigning the address signals corresponding to a required exposing area, and a step of controlling a recording system in accordance with the contents of the memory.

Figure 2:
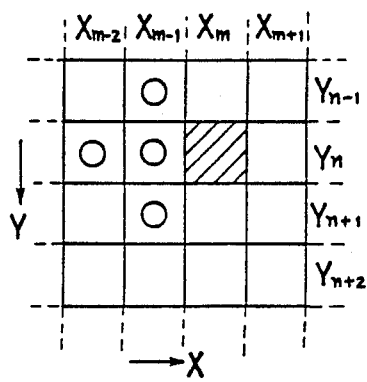
FIG. 2 schematically illustrates a part of an original picture that is divided into many divisional elements, for a purpose of a convenient description of a contour signal computation executed in the invention.

As shown in FIG. 2, an original picture is divided into many pictorial elements, and coordinates alpha-numerals are allotted to them as exemplified therein. It is supposed here that an element shaded with oblique lines is just now being scanned. The coordinates of said element are $(X_m, Y_n)$, and adjacent elements with circle marks respectively have coordinates $(X_{m-1}, Y_{n-1})$, $(X_{m-1}, Y_n)$, $(X_{m-1}, Y_{n+1})$ and $(X_{m-2}, Y_n)$. It is further assumed that amounts of sampling signals for each element are expressed with terms each comprising a symbol (S) followed by coordinates, i.e. S(X,Y). The element having the coordinates $(X_{m-1}, Y_n)$ that is disposed on a scanning line located just before the element $(X_m, Y_n)$ currently scanned will thus have a fundamental contour signal (L) defined by the following formula (1).

$$L = 4 \times S(X_{m-1}, Y_n) - \{S(X_{m-1}, Y_{n+1}) + S(X_m, Y_n) + S(X_{m-1}, Y_{n-1}) + S(X_{m-2}, Y_n)\} \quad (1)$$

For all the other pictorial elements, such contour signals (L) are computed in the contour computation circuit 16 so that they might be compared with a predetermined threshold value. One-bit contour signals (l) will be then obtained respectively from the fundamental contour signals (L) thereby the levels of the former being determined by the comparison of the latter with said threshold value.

Figure 3:
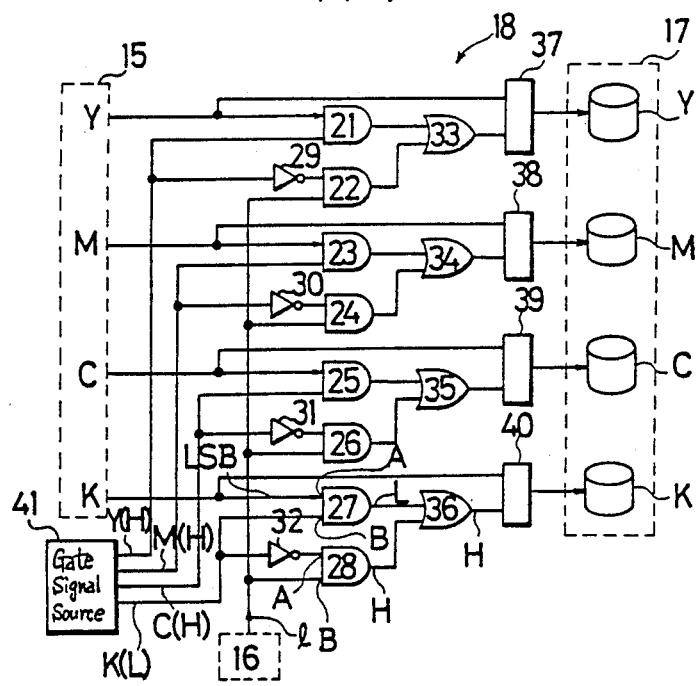
FIG. 3 is a block diagram of an example of the mixer circuit included in the exemplified apparatus in FIG. 1.

FIG. 3 shows an example of mixer circuit 18 which controls the thus obtained one-bit signals (l) to store each of them in a memory medium such as magnetic disc 17 respectively at the same address as those where the image signals are written in for storage. The members enclosed with dashed lines and having the reference numerals 15, 16 and 17 respectively correspond to those shown in FIG. 1 with these numerals. The magnetic discs 17 are provided for each of separated colors (Y), (M), (C) and (K). This mixer circuit 18 is, as illustrated in FIG. 3, a kind of logical circuit comprising AND gates 21 to 28, inverters 29 to 32, OR gates 33 to 36 and latch circuits 37 to 40.

Supposing for example that a gate signal source 41 for appointing colors of plates now appoints a plate (K) i.e. a black plate, then a gate appointing signal "LOW" (which corresponds to a low level signal) is supplied to a terminal (BT) of the AND gate 27 while at the same time being supplied to the other terminal (AT) via the inverter 32 in which the signal "LOW" is inverted into a high level signal (H). It will be noted that there is obtained no output at the output terminal of the AND gate 27 though an LSB i.e. the lowest figure of eight-bits signal appointing the black plate (K-plate) is applied to the terminal (AT) of said gate 27. As for the AND gate 28, the one-bit contour signal (l) is fed thereto at its terminal (BT) and the high level signal (H) is applied at the same time at its other terminal (AT) so that said one-bit contour signal (l) is discharged from said gate 28. Subsequently, the abovesaid one-bit contour signal (l) is supplied to the latch circuit 40 via the OR gate 36. A modified signal for the black plate (K-plate) will be then stored into the magnetic disc for K-plate after its lowest figure is substituted with the contour signal (l).

It will be seen also from FIG. 3 that also the signals corresponding to the cyan, magenta and yellow plates are written into the respective magnetic discs, but without being modified because all the gate signals appointing the plate colors other than that appointing K-plate are the high level signals (H) in this case.

Such insertion of the contour signal (l) is usually performed by selecting the black plate (K-plate). It may be however performed in the other eight-bits signal appointing the yellow plate (K-plate), if desired. The one-bit contour signal (l) will be written into the magnetic disc for the yellow plate also with said appointing signal in a manner similar to that in the first exemplified case.

It will be appreciated that the graduation grades of said image signals will be reduced from 256 levels given by eight bits upto 128 levels given by seven bits since one bit is occupied by the incorporated contour signal (l). In other words the resulting graduation pitch will be approximately 1%, which is however deemed sufficient for such a printing plate that needs not to have a so fine graduation in image reproduction process as is in the case of the black plate.

Referring again to FIG. 1, a layout station 19 is provided with a color monitor 20 which displays the outputs of the disc 17 that has an amount of stored data with the one-bit contour signal (l) incorporated, as described above, into the lowest figure of image signal for the black plate (K-plate). This display of the data including one-bit contour signal (l) is conducted, prior to a formal or regular layout, for a purpose of preliminarily correcting the contour of the image that is to be subsequently laid out.

Figures 4A, 4B:
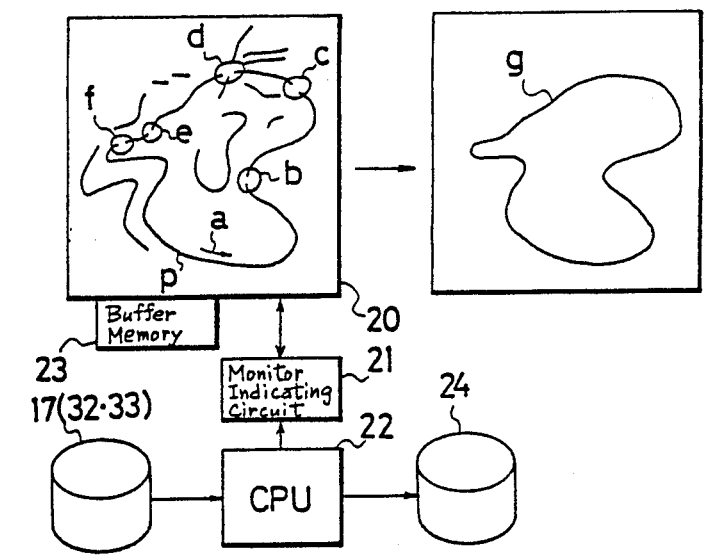
FIG. 4 illustrates a process for correcting broken contour lines on a monitor screen.

FIG. 4 illustrates the preparatory correction in a block diagram wherein the left-hand square (CONT'-A) shows an uncorrected contour and the right-hand square (CONT'-B) shows a corrected contour, both the contour being displayed on a screen of the monitor 20 one after another. The monitor is connected to a central processing unit (CPU) i.e. computer 22 by means of a monitor indicating circuit 21 having a keyboard and other functions. Said monitor 20 has a built-in buffer memory 23 whose memory capacity is designed according the number of the addresses in the display screen. Such buffer memory device serves to receive a blocked data from a main memory thereby enabling a more rapid display of visible stationary images on the monitor 20 in correspondence to the written-in image signals in the magnetic disc 17.

Many unnecessary fragmentary lines will appear on the monitor's 20 screen, at the first. This means that the computer has automatically picked up all the one-bit contour signals (l) that were of the state "1" (i.e. high) which had been selected from the two optional states "0" (i.e. low) and "1" because the fundamental contour signal (L) had proved higher than said threshold. A contour correction is then effected in the following manner. As will be seen from the left-hand square "CONT'-A", some discontinuities (b) to (f) are likely to appear when tracing the apparently continuing lines in the direction (a) thereby starting at a voluntary point (P) on one of the lines. If there is only a small distance between the adjacent ends of two discontinuous broken lines (for example, a distance approximately equal to five pictorial elements of 50 μm square), said ends may be automatically connected to each other. In the event that there are plural following lines and only one of them should be connected to the trailing end of the preceding line which is being traced, a line whose vector is most approximate to that of the latter line may be chosen manually or otherwise automatically by means of a proper software provided for said CPU.

However in the cases other than the foregoing cases, the automatical tracking will be interrupted so that an attendant operator can connect them to each other to draw a corrected line (g) (as shown in the square "CONT'-B") by means of a digitizer (not shown). The digitizer is provided with coordinates system corresponding to the monitor screen watched by him during the correction operation. The excessive or unnecessary lines are thus removed from the monitor screen.

Provided that a pictorial image be simultaneously displayed on said screen together with the contour lines, the correction of the latter will become much easier.

The corrected contour line prepared in the above manner is then utilized as an eclectic mask adapted to guide a following layout processing. The layout processing is carried out, on the basis of instructions given by the CPU 22, to treat image signals originating from plural original pictures and stored in the discs 17.

Finally, the image signals stored in the discs 17 are transferred to an output disc 24 after the above layout treatments. Then, as shown in FIG. 1, the output disc 24 already treated in the layout operation will be set on the aforedescribed recording system. An output driver circuit 25 that is provided with a buffer memory for determining an output timing is interposed between said disc 24 and the recording head so as to cooperate with a timing circuit 26. The photosensitive material on the recording cylinder 7 will then be exposed to the light irradiating from the recording head which is controlled by the output signal of the driver circuit 25 to thereby record on the material a reproduced image for which the layout treatment has been previously accomplished.

Next, according to FIG. 5, explained is another apparatus which can be also particularly used for performance of the invented method. FIG. 5 is a block diagram of the apparatus also including a color scanner. Those members indicated with the same reference number as those in FIG. 1 will not be described in detail.

One of the differences of the latter example from the former example exists in the section enclosed within the dash line where instead of the mixer circuit two individual separate magnetic discs 52 and 53 are provided as memory media each used for image signals or contour signals. One of said discs 52 is a main memory medium that has the stored data of recording signals (Y), (M), (C) and (K) allotted to locations therein of the same address arrangement as shown in FIG. 6. This main medium may alternatively, as in FIG. 1, be divided into the respective discs for each of the signals (Y), (M), (C) and (K).

The small rectangulars $(Y_1)$, $(M_1)$, $(C_1)$ and $(K_1)$ in FIG. 6 indicate the same sampling point in each of separated plates for the colors (Y), (M), (C) and (K) that have been prepared through the step of color separation of original picture and the step of correction. The contour computation circuit 16 executes at the same time the calculation mentioned above in accordance with the formula (1). The other disc 53 stores the thus obtained contour signals (L). It is, however, to be noted that said signals are written into the memory as unconverted eight-bits signals thereby no comparison of them with any threshold value being conducted. Such contour signals (L) are therefore stored at the position in said disc 53 having the same address arrangement as those for each recording signal in the disc 52, as will be seen from FIG. 6. These discs 52 and 53, into which the recording signals for each color and the contour signals are respectively stored, are processed in the layout station 19 in a manner similar to that in FIG. 1. Namely, the computer 22 processes those data in said discs to display on the color monitor 20 the contour signals or lines together with the picture itself. Then the correction of the contour lines are conducted in the same manner as in the first example. The eclectic mask prepared in this way to have a corrected contour will be used then in conducting a layout treatment for manufacturing a reproducible picture. At the last, the image signals, for which all the necessary treatments such as the layout have been finished, is written into the output disc 24. It will be apparent that the contour line is indicated with a certain graduation in this case whereas the aforedescribed contour in the former case lacks same.

It should be also appreciated that the heretofore described apparatuses or drawings thereof does not restrict the scope of the invention though it may be performed by utilizing them conveniently with a good result. Further, the above apparatuses are suitable not only for a color scanner but also for a monochromatic scanner. If a microscopic portion of the contour line must be corrected, said portion can be enlarged on the monitor screen for the correction process at any desirable magnification notwithstanding the omission of explanation thereof in the foregoing description. It is of course that the contour signals can be produced by means of an analog method instead of the described digital method.

The invented method having such composition as made clear hereinabove will bring on significant effects in improving the above apparatus in Sho. 54-29202 as well as the above method in Sho. 54-36801 to thereby give them more practical importances, beyond its natural merit in dissolving the disadvantages inevitable in the handicrafts for the eclectic masks preparation. The fact that the corrected contour line or signal is produced simultaneously with the treatment of image signals picked up by the image scanning recorder so that the contour signals and the image signals corresponding thereto are stored in the memory portions having the same address arrangement, will permit the attendant operator to simply and accurately collate the pictorial figure with the eclectic mask synthesized from the plural raw contour signals in the layout process. Further, the capacity of the memory media to be used needs not be increased when the contour signals are incorporated into the image signals and utilized in the processes necessary to manufacture the eclectic masks.

What is claimed is:

1. A method for manufacturing eclectic masks comprising the steps of:

sequentially writing in memory means one or more respective series of image signals obtained by photoelectrically scanning a series of pictorial elements constituting an original picture in a serial order of scanning line by means of image scanning and recording apparatus;

computing a series of contour signals simultaneously with the scanning and writing, the computing of each contour signal being carried out on a corresponding image signal associated with a pictorial element being scanned and on image signals associated with pictorial elements adjacent to the one being scanned;

storing each of the contour signals in the memory means at a memory location having the same address as the location in which the corresponding image signal is stored;

reading out the contour signals stored in the memory means; and preparing corrected contour signals for use in the manufacture of the eclectic mask from the contour signals read out of the memory means by first displaying on a monitor the pictorial image on which are superposed partially connected contour lines for correction of the contour lines by an operator.

2. A method as set forth in claim 1, wherein prior to writing the contour signals in said memory means the said contour signals are compared with a predetermined threshold value so as to be respectively converted into one-bit signals and are incorporated into the corresponding image signals at the lowest figure thereof.

3. A method as set forth in claim 2, wherein the one-bit contour signals are respectively incorporated into image signals produced for black plates.

4. A method as set forth in claim 1 wherein the contour signals are multibit signals and are stored in a memory separate from the memory in which corresponding image signals are stored but with the same address.

* * * * *